United States Patent
Köster (10) Patent No.: US 12,194,797 B2
(45) Date of Patent: Jan. 14, 2025

(54) CONNECTION SYSTEM AND CONNECTION UNIT

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 1095 days.

(21) Appl. No.: 15/733,792

(22) PCT Filed: Aug. 21, 2019

(86) PCT No.: PCT/EP2019/072345
§ 371 (c)(1),
(2) Date: Oct. 26, 2020

(87) PCT Pub. No.: WO2020/038986
PCT Pub. Date: Feb. 27, 2020

(65) Prior Publication Data
US 2021/0039459 A1    Feb. 11, 2021

(30) Foreign Application Priority Data
Aug. 22, 2018   (DE) ..................... 10 2018 120 470.1

(51) Int. Cl.
*B60D 1/64* (2006.01)
*B62D 53/08* (2006.01)
*B62D 53/12* (2006.01)

(52) U.S. Cl.
CPC ............. *B60D 1/64* (2013.01); *B62D 53/125* (2013.01); *B62D 53/0842* (2013.01)

(58) Field of Classification Search
CPC . B60D 1/015; B60D 1/58; B60D 1/52; B60D 1/64; B60D 1/36; B60D 1/40;
(Continued)

(56) References Cited

U.S. PATENT DOCUMENTS 2,062,806 A * 12/1936 Casler ................. F16L 55/1007
                                                                  280/421
5,135,410 A *  8/1992 Kawase ........... H01R 13/62938
                                                                  439/372
(Continued)

FOREIGN PATENT DOCUMENTS

CN       101990503 A      3/2011
CN       101108580 B     11/2011
(Continued)

OTHER PUBLICATIONS

European Patent Office; International Search Report; Nov. 4, 2019.

*Primary Examiner* — Christopher B Wehrly
(74) *Attorney, Agent, or Firm* — Price Heneveld LLP (57) ABSTRACT

A connection system for use on a fifth-wheel coupling includes first and second connection units each including a carrier unit and a plug-in unit each having a coupling axis and mounted on the respective carrier unit so as to be able to pivot about a respective pivot axis, a, the first and second plug-in units respectively including a coupling region of an electrical line element and/or a fluid-conveying line, the second connection unit mounted on a semi-trailer to be pivotable about a pivot axis such that the second connection unit can be moved into a coupling position, wherein the second pivot axis extends parallel to the first pivot axis when the second connection unit is in the coupling position, and wherein the first coupling axis is essentially collinear with the second coupling axis if the first and second plug-in units are in the coupling position.

12 Claims, 5 Drawing Sheets

(58) Field of Classification Search
CPC ............ B62D 53/0842; B62D 53/0885; B62D 53/125; B62D 53/0482
USPC .................................................. 280/240, 420
See application file for complete search history.

(56) References Cited

U.S. PATENT DOCUMENTS

| | | | | |
|---|---|---|---|---|
| 5,346,239 A * | 9/1994 | Wohlhuter | ............ | B62D 53/125 280/422 |
| 5,513,997 A * | 5/1996 | Taguchi | .................... | B60D 1/64 439/157 |
| 6,179,319 B1 * | 1/2001 | Malisch | ............... | B62D 53/125 280/477 |
| 7,464,967 B2 * | 12/2008 | Mieger | ................. | E02F 9/2271 37/468 |
| 7,959,178 B2 * | 6/2011 | Alguera | .................... | B60D 1/62 280/421 |
| 8,052,164 B2 * | 11/2011 | Alguera | ............... | B62D 53/125 280/421 |
| 8,177,559 B2 * | 5/2012 | Alguera Gallego | ..... | B60D 1/64 439/35 |
| 8,335,607 B2 * | 12/2012 | Gatten | .................... | B60D 1/64 701/31.1 |
| 8,678,419 B2 * | 3/2014 | Glazner | ............... | B62D 53/125 280/421 |
| 8,770,612 B2 * | 7/2014 | Wendte | .................... | B60D 1/62 280/421 |
| 8,840,128 B2 * | 9/2014 | Glazner | ................. | B60D 1/015 280/422 |
| 9,968,021 B2 * | 5/2018 | Emmert | .................... | B60D 1/64 |
| 10,913,318 B2 * | 2/2021 | Algüera | ................. | B60D 1/02 |
| 2002/0050698 A1 * | 5/2002 | Dippenaar | ............... | B60D 1/62 280/422 |
| 2006/0249927 A1 * | 11/2006 | Metternich | ............... | B60D 1/02 280/515 |
| 2007/0114759 A1 * | 5/2007 | Biondi | ............... | B62D 53/0871 280/434 |
| 2009/0267321 A1 * | 10/2009 | Alguera | .................... | B60D 1/64 280/504 |
| 2010/0059967 A1 * | 3/2010 | Alguera | ................. | B60D 1/363 280/420 |
| 2011/0092080 A1 * | 4/2011 | Alguera Gallego | ..... | B60D 1/64 439/35 |
| 2019/0299729 A1 * | 10/2019 | Sokuza | .................... | B61G 1/28 |
| 2019/0350118 A1 * | 11/2019 | Maro | .................... | A01B 59/042 |
| 2021/0300136 A1 * | 9/2021 | Algüera | ................. | B60D 1/015 |

FOREIGN PATENT DOCUMENTS

| | | |
|---|---|---|
| CN | 10156060 B | 10/2012 |
| DE | 102006020069 A1 | 11/2007 |
| DE | 102006033899 A1 | 1/2008 |
| DE | 102008014572 A1 | 9/2009 |
| DE | 102008001349 A1 | 11/2009 |
| EP | 1655212 A1 | 5/2006 |
| EP | 1900620 A1 | 12/2007 |

* cited by examiner

CONNECTION SYSTEM AND CONNECTION UNIT

BACKGROUND OF THE INVENTION

The present invention relates to a connection system and a connection unit for use in a commercial vehicle.

Connection systems for supplying trailers of articulated vehicles with compressed air, electrical or hydraulic energy are known from the prior art. In this case, the connection of the lines on the towing vehicle to lines that are provided on the trailer has been hitherto realized in the prior art by virtue of the fact that manually individual plug connectors on lines that are mainly configured so as to be elastic are manually coupled between the trailer and the towing vehicle. Alternatively thereto, solutions for a connection system have been tested in which a first plug connector is fixed in the region of the coupling plate and a further set of plug connectors is arranged on the coupling unit on the trailer and is arranged so as to be able to pivot about the longitudinal axis or the vertical axis of the king pin. In this manner, it is possible when the towing vehicle and the trailer are in a horizontal oblique position with respect to one another despite this to produce a reliable connection between the towing vehicle and the trailer. However, in the case of the solutions known in the prior art, it is necessary for the trailer to be arranged exactly at the correct height relative to the towing vehicle in order to render it possible to provide a plug connection between the plug connector that is arranged on the towing vehicle and the plug connector that is arranged on the trailer. Furthermore, in the case of the connection systems known in the prior art excessive wear frequently occurs in the region of the plug-in contacts. Moreover, solutions are known in which all plug connections are arranged in the king pin, however this requires a complex control mechanism in order to close the plug connection after the king pin has been coupled into.

The object of the present invention is to provide a connection system for a commercial vehicle that renders it possible to perform a connection even if the trailer and the towing vehicle are greatly offset with respect to one another and that reduces the material wear on the connection system.

SUMMARY OF THE INVENTION

In accordance with the invention, the connection system comprises a first connection unit for fixing to a towing vehicle and a second connection unit for fixing to a semi-trailer, wherein the first connection unit comprises a first carrier unit and a first plug-in unit having a first coupling axis, wherein the first plug-in unit is mounted on the first carrier unit so as to be able to pivot about a first pivot axis, wherein the second connection unit comprises a second carrier unit and a second plug-in unit having a second coupling axis, wherein the second plug-in unit is mounted on the second carrier unit so as to be able to pivot about a second pivot axis, wherein the first plug-in unit and the second plug-in unit respectively comprise at least one coupling region of an electrical line element and/or at least of one fluid-conveying line, wherein the second connection unit is mounted on the semi-trailer so to be able to pivot about a third pivot axis in such a manner that said second connection unit can be moved into a coupling position, wherein when the second connection unit is in the coupling position the second pivot axis extends parallel to the first pivot axis, wherein the first coupling axis is oriented essentially in a collinear manner with respect to the second coupling axis if the first plug-in unit and the second plug-in unit are located in the coupling position. The connection system thus comprises two fundamental components: one part that is arranged on the towing vehicle and is defined here as the first connection unit. A second part of the connection system is fixed to the trailer or to the semi-trailer of the commercial vehicle and in this case in particular is fixed so as to be able to pivot about a third pivot axis that is expediently also simultaneously the cylindrical axis, or vertical axis, of the king pin. In this case, the first connection unit comprises a first carrier unit and a first plug-in unit, wherein the plug-in unit is fixed to the first carrier unit so as to be able to pivot about a first pivot axis. Likewise, the second connection unit is also equipped with a second carrier unit and a second plug-in unit, wherein the second plug-in unit is fixed to the second carrier unit so as to be able to pivot about a second pivot axis. In this case, the second carrier unit advantageously comprises at least two plate-like attachment sections that extend in an essentially vertical manner with regard to the trailer and the second plug-in unit is fixed to said attachment sections so as to be able to pivot about a second pivot axis. As an alternative or in addition to the plate-like design, the carrier unit can also comprise a frame. In this case, the plate-like design renders it possible to replace the plug-in units in a rapid manner. In other words, the second carrier unit encloses the second plug-in unit preferably on the distal ends thereof along the second pivot axis. The first plug-in unit and the second plug-in unit respectively comprise a coupling region, in other words a plug-in region that is connected to an electrical line element or to a fluid-conveying line. Advantageously, each of the plug-in units comprises a multiplicity of coupling regions for connecting electrical lines or fluid-conveying lines. The fact that the first pivot unit and the second pivot unit are able to pivot independently of one another ensures in particular that using the present invention it is possible to compensate a height offset or an oblique position about a transverse axis of the commercial vehicle. It is possible for such an oblique position to occur in particular also then if the towing vehicle is standing with its rear axle in a depression and consequently the combination of towing vehicle and semi-trailer, when viewed from the side, has a downwards-facing bend. In this state, the pivotability of the first connection unit and of the second connection unit ensures that despite such an oblique position the two coupling axes can be brought into collinearity with respect to one another and consequently the two connection units can be plugged together in a simple and low-wear manner. In this case, in particular it is possible to prevent bending forces that occur on the connection units and consequently possible to prevent bending stresses that occur and the serviceable life of the connection unit can be considerably increased. In this case, the second connection unit that is fixed to the semi-trailer is mounted so as to be able to rotate or pivot about a third pivot axis with the result that even if the towing vehicle is in an oblique position with respect to the trailer it is possible to perform a coupling, in that the second connection unit is pivoted relative to the semi-trailer in order to arrange the first connection unit precisely opposite. In this case, the coupling position is the position of the first plug-in unit and the second plug-in unit in which said units can be plugged together directly to one another or are already plugged together, wherein the coupling axes of the two plug-in units are oriented in a collinear manner. Advantageously, in this case, the coupling axes of the respective plug-in unit are oriented in a perpendicular or orthogonal manner with respect to the respective pivot axis of the plug-in unit, in other words the plug-in units are fixed to the respective carrier unit centrally for example by means of a sleeve bearing or pin bearing arrangement in such a manner that the coupling axis intersects the pivot axis and in this case the coupling axis is oriented in an orthogonal manner with respect to the pivot axis. The first pivot axis and second pivot axis of the respective plug-in unit are expediently oriented in a perpendicular or orthogonal manner with respect to the third pivot axis of the second connection unit.

It is particularly preferred that at least one of the plug-in units comprises a limited floating mounting arrangement. It is hereby rendered possible to compensate by virtue of small offset movements along and/or in a transverse manner with respect to the pivot axis of the control unit and it is made easier to locate the coupling position with the respective opposite-lying plug-in unit. In this case, it is particularly preferred that the connector head of the plug-in unit is mounted in a floating manner, in other words with an amount of clearance in the millimeter range relative to the base part of the plug-in unit.

Advantageously, the first plug-in unit comprises an idle position, wherein a restoring means engages with the first plug-in unit and/or the center of gravity of the first plug-in unit is spaced apart from the first pivot axis in such a manner that a restoring force that leads to the idle position is prevailing at or engages with the first plug-in unit. It is preferred that, when the first plug-in unit is not connected to the second plug-in unit, said first plug-in unit is held in an idle position and said idle position is to be realized in particular by means of a restoring means with the aid of the effect of the force of gravity.

In this case, a stop is advantageously provided on the first carrier unit and said stop delimits or cushions the pivot movement of the first plug-in unit in a first direction. In this case, it is preferred that the plug-in unit strikes against the stop if said plug-in unit is located in the idle position. The stop is advantageously formed from an elastically deformable and/or damping material with the result that as the plug-in unit strikes against the stop, although the movement of said plug-in unit is cushioned, it is not completely limited.

Advantageously, the second plug-in unit also comprises an idle position, wherein the first plug-in unit and/or the second plug-in unit are able to pivot with a maximal pivot angle of 7° to 40°, preferably of 10° to 30° and particularly preferred of 10° to 30°, out of the respective idle position in at least one direction. It has been shown that for the conventional combinations of towing vehicle and semi-trailer an angle range of 7° to 40° of possible pivot movement provides a good compromise between minimizing the installation space required by the connection units and a possible versatile usability of the connection systems for different towing vehicle/semi-trailer combinations. The angle range of 10° to 30° has proven to be particularly useful on commercial vehicles with a total weight of 40 t, in which a height limitation also reduces the installation space that is available on the fifth-wheel coupling. The particularly preferred range of 10° to 20° maximal deflection in one direction is particularly preferred for commercial vehicles that are used solely in road traffic and do not need to be coupled in difficult terrain and accordingly profit from an even flatter and more compact fifth-wheel coupling to the connection system.

In a preferred embodiment, the center of gravity of the first plug-in unit is spaced apart from the first pivot axis with a 0.1 to 0.5 times, preferably with a 0.1 to 0.3 times, in the maximal length of the first plug-in unit measured along the first coupling axis. By virtue of sufficiently spacing the center of gravity of the plug-in unit from the first pivot axis and thus from the point at which the first plug-in unit is pivotably suspended, it is possible to realize sufficient restoring force with the aid of the force of gravity on the first plug-in unit. It is been shown that the spacing of the center of gravity from the first pivot axis should be at least 0.1 to 0.5 times the entire length of the first plug-in unit measured along the coupling axis in order to transmit a permanently sufficiently high torque to the first plug-in unit about the first pivot axis which returns the first plug-in unit into the idle position. Particularly preferred in this case is the ratio range of 0.1 to 0.3 which realizes a not completely eccentric suspension of the first plug-in unit, wherein in particular it is also taken into consideration that attached to a distal end of the plug-in unit is a line by way of which hydraulic or pneumatic pressure or electrical voltage is transmitted to the plug-in unit.

It is preferred that, when the first plug-in unit is in the idle position, the first coupling axis is oriented parallel to the surface on which the towing vehicle is standing. Furthermore, it is preferred that the idle position of the first plug-in unit is provided in such a manner that the first coupling axis is oriented in the idle position in a horizontal manner relative to the ground on which the towing vehicle is standing. This renders it possible that for the highly likely occurrence that a coupling between the first plug-in unit and the second plug-in unit is performed along an axis that is parallel to the ground, the first plug-unit is already in the correct position.

Furthermore, it is preferred that the first plug-in unit comprises at least one first connector head that comprises engaging means for engaging with the second plug-in unit. The connector head of the first plug-in unit is in this case preferably configured so as to be longitudinally displaceable along the coupling axis relative to the rest of the first plug-in unit and in particular is suitable by way of a corresponding geometric shape for the purpose of being pushed over a corresponding geometric shape on the second plug-in unit. For this purpose, the connector head comprises as engaging means preferably a cylindrical bore hole that is arranged in a preferably cylindrical sleeve. As an alternative to the cylindrical bore hole, it could be possible in the region of the connector head to also provide guiding surfaces that for example guide contacts, which are formed flat on the plug-in units, towards one another into the correct position. In this case, it is particularly preferred that contacts are arranged in the region of the connector head so as to produce an electrical connection and alternatively or in addition thereto to also provide sealing elements that have corresponding flow cross sections so as to transmit fluid pressure, in particular hydraulic or pneumatic pressure to the second plug-in unit.

It is preferred that the first connector head is pre-stressed with respect to a first base part of the first plug-in unit by means of a restoring means, wherein the restoring means allows the first connector head to be displaced in a resilient manner along the first coupling axis relative to the first base part. It is particularly preferred that the restoring means is embodied as a coil spring or as a rubber sleeve. A coil spring has the advantage that it can provide a particularly long restoring travel and can thus accordingly transmit a restoring force to the connector head for a large displacement length of the connector head relative to the first base part. A rubber sleeve is then particularly preferred if in addition to the restoring force it is also to realized that the movement of the first connector head is damped. In this case, the pre-stressed mounting of the connector head renders it possible in the case of relative movements on the entire fifth-wheel coupling system to hold the connector head in permanent engagement with the second plug-in unit and thus to realize a reliable transmission of electrical energy and/or fluid pressure.

In a preferred embodiment, the second plug-in unit is influenced by means of a second restoring means with a restoring force which guides the second plug-in unit into an idle position relative to the second carrier unit, wherein the second plug-in unit can be pivoted in both pivot directions about the second pivot axis against the respective restoring force of the second restoring means. In a similar manner to using a restoring means in order to pre-stress the first plug-in unit in the direction of the idle position, the second plug-in unit also comprises a restoring means that engages with the second carrier unit and pivots the second plug-in unit in the direction of its idle position. In this case, the second plug-in unit can be pivoted starting from the idle position, preferably in both pivot directions, about the second pivot axis, in other words said second plug-in unit can be pivoted both upwards and also downwards with regard to the semi-trailer. This renders it possible for a second connection unit that is attached to a semi-trailer to be adapted to suit different towing vehicles and accordingly to suit first connection units that are provided on these towing vehicles since the second plug-in unit can readily perform a pivot movement in the upwards and also downwards direction. In this case, the idle position of the second plug-in unit is advantageously characterized in that the second coupling axis is oriented in a horizontal or parallel manner with respect to the surface on which the semi-trailer is standing.

It is particularly preferred that the first connection unit is fixed below the coupling plate of a fifth-wheel coupling and the second connection means is preferably fixed directly to or adjacent to a kingpin of the semi-trailer. By virtue of arranging the first connection unit below the coupling plate, it is possible on the one hand to use the installation space below the coupling plate in a particularly efficient manner. On the other hand, the first connection unit is protected by means of the coupling plate against environmental influences and against violent imparts from foreign bodies. In this case, it is preferred that the connector head of the first connection unit protrudes below the coupling plate in such a manner in the direction of the semi-trailer that the second connection unit can engage therewith. The second connection unit is fixed preferably directly or in close proximity to the kingpin on the semi-trailer in such a manner as to be able to pivot about a third pivot axis. "Adjacent" or "in close proximity" means in particular a spacing of less than 120 cm, preferably less than 90 cm, and particularly preferred less than 60 cm with respect to the third pivot axis. In this case, it is possible to provide a wedge-shaped element connected to the second connection unit, wherein said wedge-shaped element engages in a V-shaped recess that is typically provided on the rear face of the coupling plate and during the procedure of coupling the semi-trailer to the towing vehicle said wedge-shaped element orients the second connection unit correctly with respect to the first connection unit in such a manner that it is possible to perform a connection between the first connection unit and the second connection unit.

Furthermore, it is preferred that the second carrier unit comprises a guiding region that renders it possible for the second plug-in unit to be displaced in a transverse manner with respect to the second pivot axis along a guide path and secures the second plug-in unit against being displaced in a transverse manner with respect to the guide path. The guiding region of the second carrier unit preferably extends in a longitudinal manner and renders it possible for the second plug-in unit to be displaced along a guide path that is defined by the guiding region. In this case, it is preferred that the guide path extends in a predominantly vertical manner, in other words the portion of the guide path that extends in the vertical direction is greater that the portion of the guide path that extends in the horizontal direction. By virtue of the fact that the second plug-in unit is displaced along the guide path, it is possible for said second plug-in unit to be moved to the correct height for coupling in the optimal manner to the first plug-in unit. This supports in addition to the pivotability of the second plug-in unit a collinear as possible orientation of the two coupling axes with respect to one another. It is hereby possible that the direct coupling procedure itself, in other words the procedure in which the two plug-in units are plugged together, can be performed in a low-friction manner and in a manner in which minimal bending stresses occur at the respective corresponding geometric shapes of the two plug-in units.

In this case, it is particularly preferred that the guiding region is embodied as an elongated hole and the guide path is accordingly a straight line. A design as an elongated hole is particularly simple to produce and the second plug-in unit can be guided by means of a pin-shaped engaging geometric shape on the guiding region.

Furthermore, it is preferred that an insertion aid is fixed indirectly or directly to the first carrier unit or to the second carrier unit, wherein said insertion aid pivots the respectively opposite-lying plug-in unit during the coupling procedure in such a manner that the coupling axes move into collinearity with one another. The insertion aid is preferably a part that is embodied as a sheet metal plate or a protrusion that cooperates accordingly with the first plug-in unit or the second plug-in unit in such a manner that as the towing vehicle and the semi-trailer are coupled together the plug-in unit slides along on the insertion aid and in this case is pivoted into the correct position relative to the respectively opposite-lying plug-in unit. In this manner, the insertion aid ensures that it is possible to produce collinearity between the two coupling axes in order to couple the plug-in units together. In doing so, the preferred floating mounting arrangement at least of one of the plug-in units is of advantage and renders it possible to compensate for the coupling axes being offset with respect to one another.

Whereas up to now the connection system comprising two connection units, one of which is located on the towing vehicle and the other on the semi-trailer, has been described, a connection unit is also provided within the scope of the invention for use in a fifth-wheel coupling, comprising a carrier unit and a plug-in unit, wherein the carrier unit can be fixed or is fixed to a towing vehicle or to a semi-trailer and wherein the plug-in unit is mounted on the carrier unit so as to be able to pivot about a pivot axis, wherein the plug-in unit comprises at least one connector head that is configured for coupling to a further plug-in unit and comprises at least one coupling region of an electrical line element and/or at least one fluid-conveying line, wherein the coupling region comprises a cross section that is constant along a coupling axis, wherein the coupling axis is perpendicular with respect to the pivot axis. As previously described, the connection unit comprises a carrier unit and a plug-in unit, wherein the carrier unit is fixed to a towing vehicle or to a semi-trailer. In the event that the carrier unit is fixed to the semi-trailer, it is preferred that said carrier unit is mounted so that it can be pivoted in addition to about an additional pivot axis about the kingpin of the semi-trailer. At least however the plug-in unit of the connection unit is mounted on the carrier unit so as to be able to pivot about a pivot axis in such a manner that it is possible to compensate a height difference between the pivot axis of the plug-in unit provided here and an opposite-lying plug-in unit. Furthermore, the plug-in unit comprises at least one connector head that is configured for coupling to a further plug-in unit and comprises at least one coupling region of an electrical line element or a fluid line. In the event that the coupling region is used to transmit electrical voltage, it is preferably equipped with contacts that render it possible to transmit from at least one, preferably multiple, line elements. In the event that the coupling region is configured for conveying fluid, engaging geometric shapes are preferably provided for engaging and fixing in a positive-locking manner the fluid-conveying line and accordingly provided are sealing elements that are arranged in these engaging means and that render it possible to reliably transmit fluid pressure from the towing vehicle to the semi-trailer. In a preferred embodiment, the plug-in unit comprises a multiplicity of connector heads that are provided in such a manner that they cannot be pivoted with respect to one another but can be pivoted jointly about the pivot axis.

It is preferred that the carrier unit can be fixed relative to the towing vehicle or to the semi-trailer about a third pivot axis thereon. By virtue of pivoting the carrier unit about a third pivot axis, it is rendered possible in particular when the towing vehicle is in an oblique position with regard to the semi-trailer to still be able to perform a coupling, wherein simultaneously the connection unit also engages with an opposite-lying connection unit. For this purpose, the connection unit is preferably pivoted about a perpendicular axis, in other words the third pivot axis, relative to the towing vehicle or semi-trailer in such a manner that said connection unit can engage with an opposite-lying part of the connection unit.

In a further preferred embodiment, the connector head is pre-stressed with respect to a first base part of the plug-in unit by means of a restoring means, wherein the first restoring means allows the connector head to be displaced in a resilient manner along the first coupling axis relative to the first base part.

A stop is advantageously provided on the carrier unit, wherein in the idle position the plug-in unit lies against the stop. The stop is advantageously embodied as a protrusion or as a sheet metal-like part that delimits the pivot movement of the plug-in unit in one direction in such a manner that when the plug-in unit has moved into its idle position, said plug-in unit comes to lie against the stop. In this case, the plug-in unit can be pre-stressed in the direction of its idle position by means of the effect of the force of gravity or by means of a restoring means.

BRIEF DESCRIPTION OF THE DRAWINGS

Further advantages and aspects of the present invention emerge from the following description with reference to the attached figures. It goes without saying that individual features that are illustrated only in one of the figures can also be used in other embodiments insofar as this is not explicitly excluded or forbidden owing to technical conditions.

In the drawings.

DETAILED DESCRIPTION OF THE PREFERRED EMBODIMENT

Figure 1:
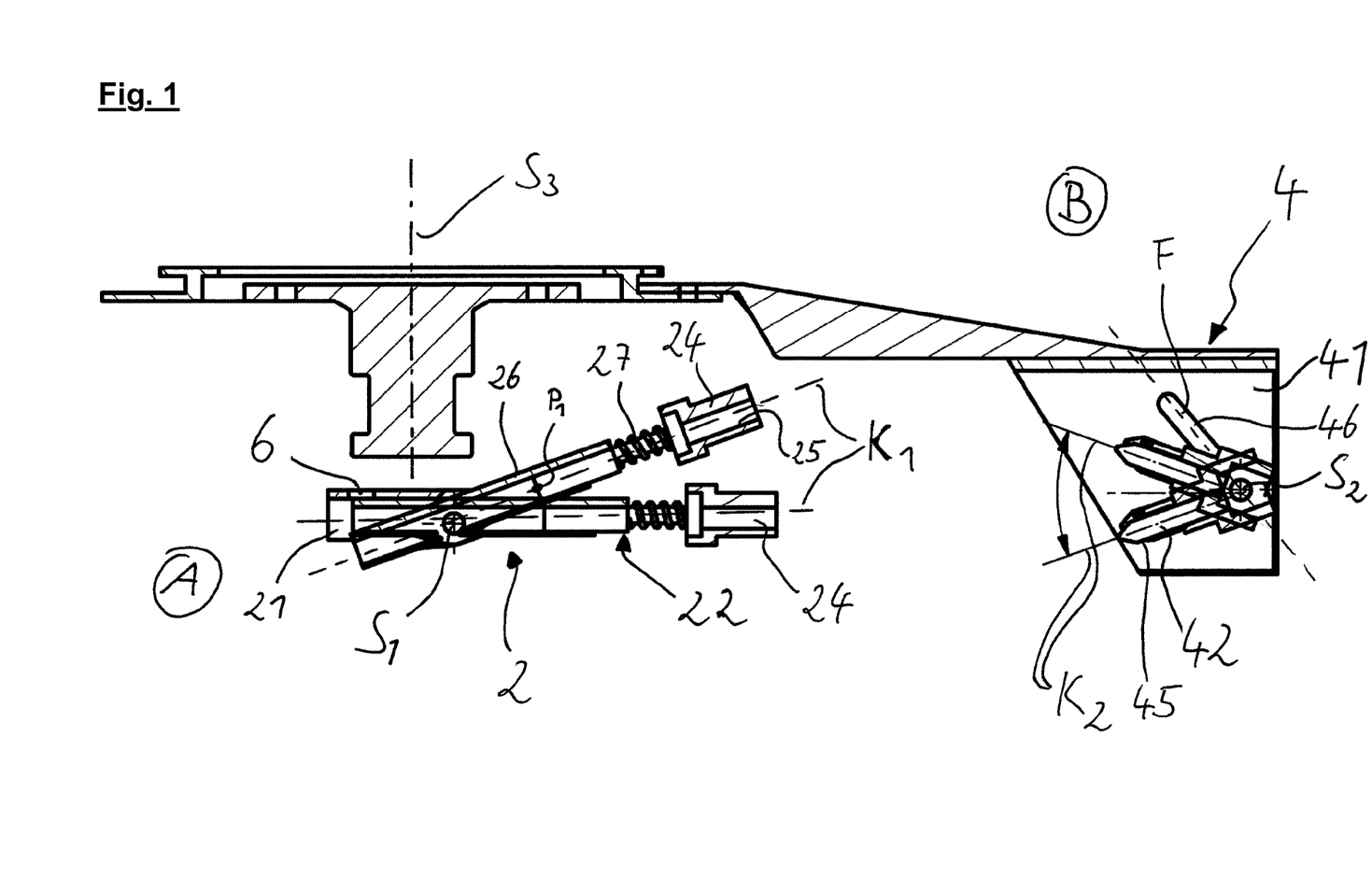
FIG. 1 is an in-part sectional side elevation view of a connection system.

In the case of the preferred embodiment of the connection system in accordance with the invention illustrated in FIG. 1, a first connection unit 2 is fixed to a fifth-wheel coupling plate, not illustrated, of a fifth-wheel coupling, not illustrated, and a second connection unit 4 is fixed in the region of the kingpin, a section of said kingpin being illustrated in the figure. The first connection unit 2 comprises in this case a first carrier unit 21 to which a first plug-in unit 22 is fixed in such a manner that said first plug-in unit is able to pivot about a first pivot axis. The first plug-in unit 22 comprises a base section 26 and a connector head 24, wherein the connector head is pre-stressed along the first coupling axis $K_1$ by means of a first restoring means 27. The first restoring means 27 is embodied in this preferred embodiment as a coil spring and is used in particular for the purpose of providing a spacing between the connector head 24 and the first base section 26. The first plug-in unit 22 comprises in this case its greatest extension and thus its length parallel to the first coupling axis $K_1$. FIG. 1 illustrates the first plug-in unit 22 in this case in two positions: once in its idle position in which the first coupling axis $K_1$ is oriented in an essentially horizontal manner and on the other hand in a pivoted position in which the coupling axis $K_1$ is pivoted about an angle of approx. 20° to 30° upwards out of the horizontal position. A stop 6 is provided on the face of the first plug-in unit 22, said face being remote from the connector head 24 and the plug-in unit 22 comes to lie against said stop when said plug-in unit is located in its idle position. In the case of this preferred embodiment, the first plug-in unit 22 can thus not be pivoted downwards out of the horizontal position or it is held in an at least horizontal position. It is hereby particularly preferred that it is possible without a pivot movement to perform a horizontal coupling to a second plug-in unit 4 that is fixed to the semi-trailer B. Furthermore, the figure also illustrates the center of gravity $P_1$ of the first plug-in unit 22 that in the figure is offset to the right spaced apart from the first pivot axis $S_1$. The weight force of the first plug-in unit 22 is considered simply at this point and thus pivots the first plug-in unit 22 in the direction of its idle position, in other words in the direction of a horizontal position. The stop 6 is advantageously fixed to the first carrier unit 21 or is embodied as one piece with said first carrier unit. The second plug-in unit 42 is likewise illustrated in two pivot positions, wherein the section plug-in unit 42 can be pivoted both upwards and also downwards and the second plug-in unit 42 is adjusted into the idle position by way of a restoring element (cf. in this regard FIG. 5). A guiding geometric shape 46 is embodied on the second carrier unit 41 and said guiding geometric shape renders it possible for the second plug-in unit 42 to be displaced along a guide path F. In the present illustrated example, the guide path F is a straight line and the guiding geometric shape 46 is embodied as an elongated hole in the sheet metal-like vertically-oriented part of the carrier unit 41. The guiding geometric shape 46 renders it possible in this case for the second plug-in unit 42 to perform a transversal movement in an oblique manner upwards or in an oblique manner downwards, wherein in particular the vertical portion of this displacement contributes to the fact that the second plug-in unit 42 can be displaced relative to the first plug-in unit 22 in such a manner that the connector head 24 can engage with the second coupling region 45 on the second plug-in unit 42 without thereby considerable transverse forces occurring, in other words without forces occurring in a transverse manner with respect to the coupling axes $K_1$ and $K_2$. In the case of the embodiment illustrated in FIG. 1, the first pivot axis $S_1$ is in this case preferably arranged at approximately the same height with regard to the horizontal as the second pivot axis $S_2$. This leads to the fact that only a slight pivot movement of the first plug-in unit 22 and of the second plug-in unit 42 is necessary in order to realize a corresponding collinear orientation of the first coupling axis $K_1$ with respect to the second coupling axis $K_2$.

Figure 2:
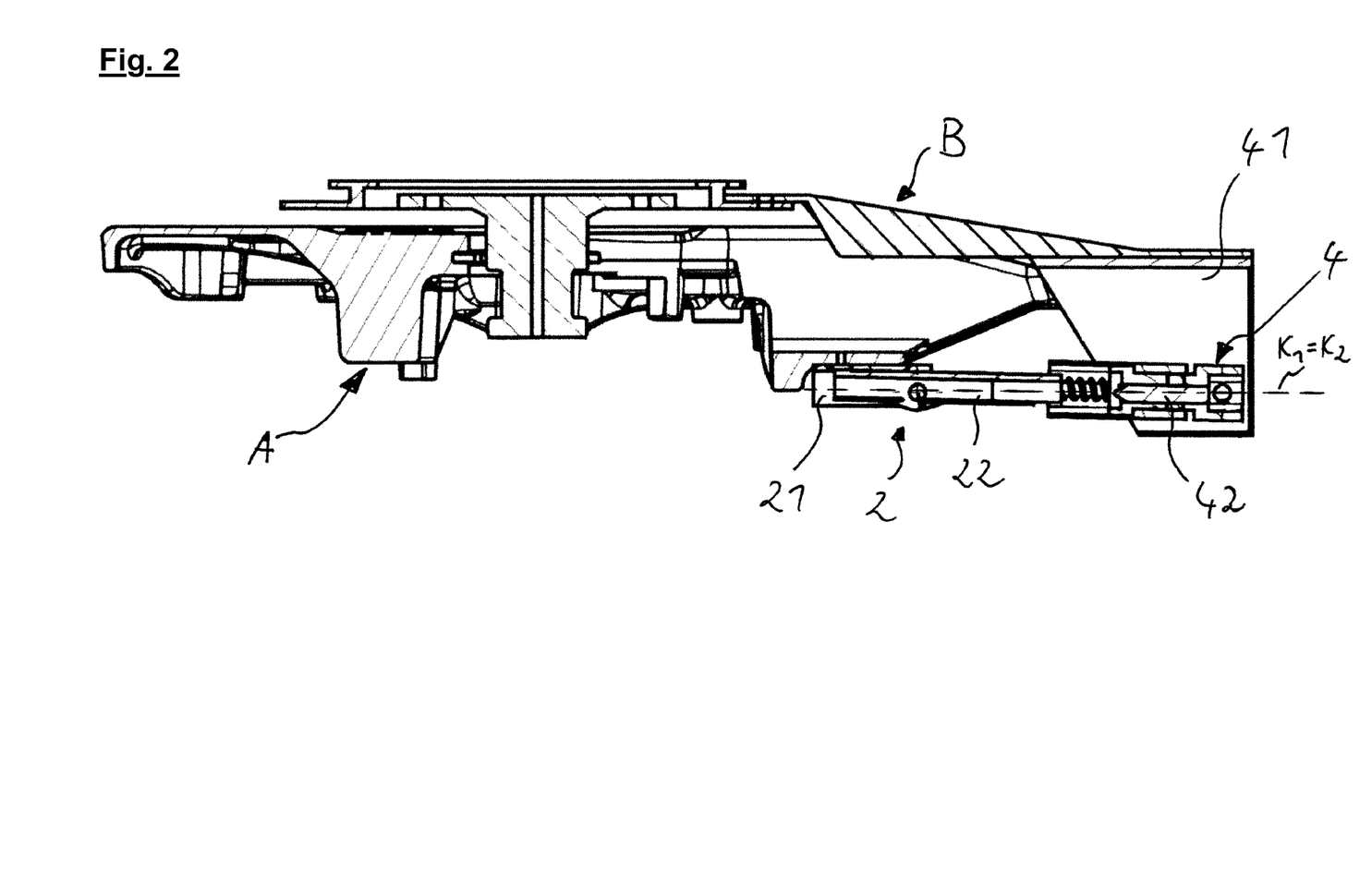
FIG. 2 is an in-part sectional side elevation view of a connection system in the coupled-together state.

FIG. 2 finally illustrates the embodiment shown in FIG. 1 of the connection system in accordance with the invention in the coupled-together state. In this case, the first coupling axis $K_1$ is oriented in a collinear manner with respect to the second coupling axis $K_2$ and the connector head 24 of the first plug-in unit 22 engages with the coupling region 45 on the second plug-in unit 42. The first plug-in unit 22 is advantageously located in this case in its idle position, in other words in the present example essentially in a horizontal position, and lies against its stop 6.

Figure 3:
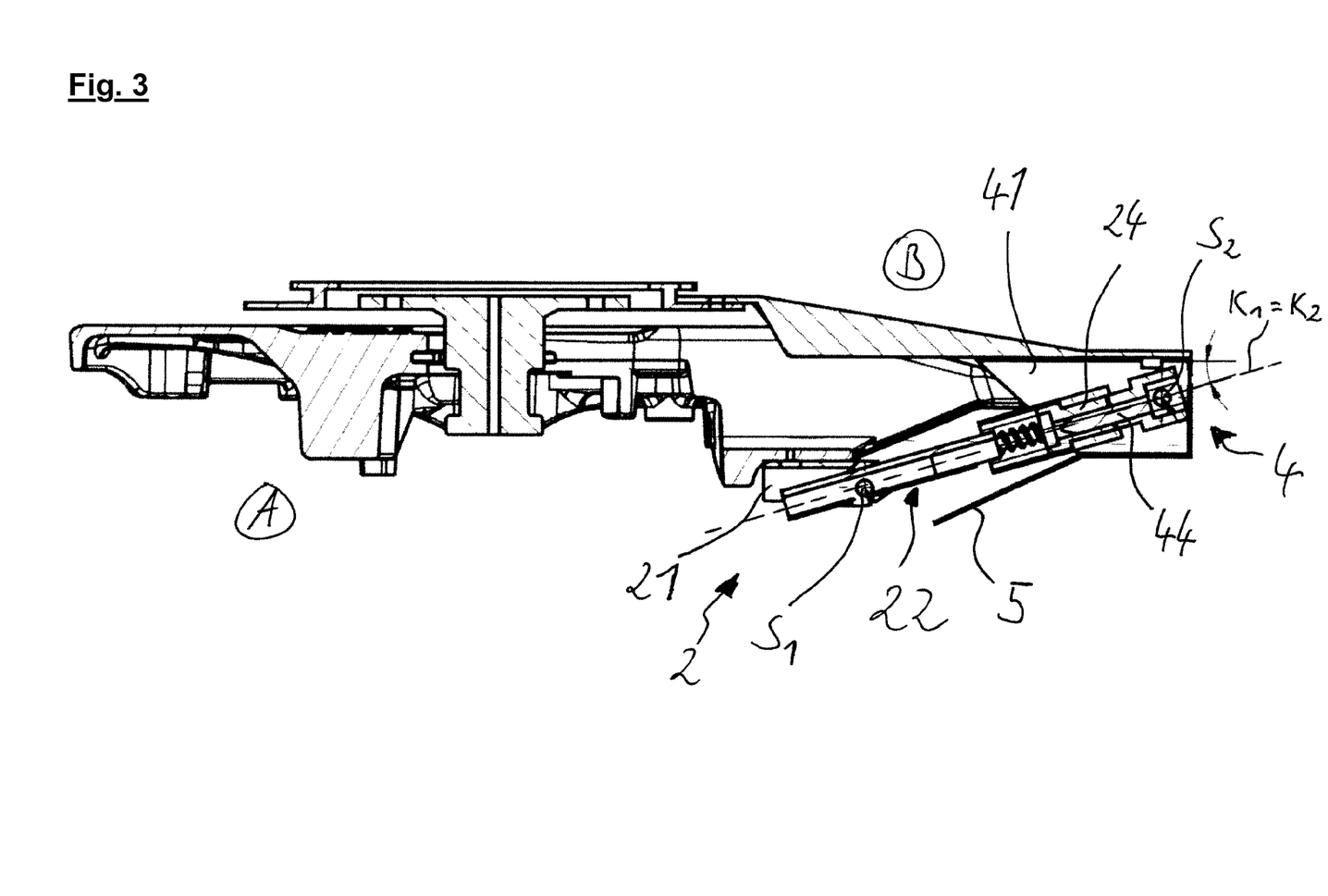
FIG. 3 is a sectional side elevation view of a further embodiment of a connection system in the coupled-together state.

FIG. 3 illustrates an alternative to the embodiment shown in FIGS. 1 and 2, wherein so as to couple the first plug-in unit 22 and the second plug-in unit 42 in particular an oblique orientation of the first coupling axis $K_1$ and the second coupling axis $K_2$ is provided. The first connection unit 2 is constructed and arranged in an identical manner in this case to the first connection unit 2 that is illustrated in the FIGS. 1 and 2. The second connection unit 4 comprises a second carrier unit 41 that comprises a shorter extension in the vertical direction. In the case of this embodiment, an insertion aid 5 is advantageously fixed to the second connection unit 4, in particular as one piece directly to the second carrier unit 41. During the procedure of coupling the fifth-wheel coupling pin of the semi-trailer B, the first plug-in unit 22 is pivoted upwards along the insertion aid 5 in such a manner that said first plug-in unit can engage with the second plug-in unit 42. A similar insertion aid is preferably also arranged on the towing vehicle A and ensures that the second plug-in unit 42 of the embodiments of the FIGS. 1-3 is pivoted accordingly downwards with the result that finally a collinear orientation of the first coupling axis $K_1$ and the second coupling axis $K_2$ is realized, and the first plug-in unit 22 and the second plug-in unit 42 can be inserted one inside the other in a low-resistance and low-stress manner as possible.

Figure 4:
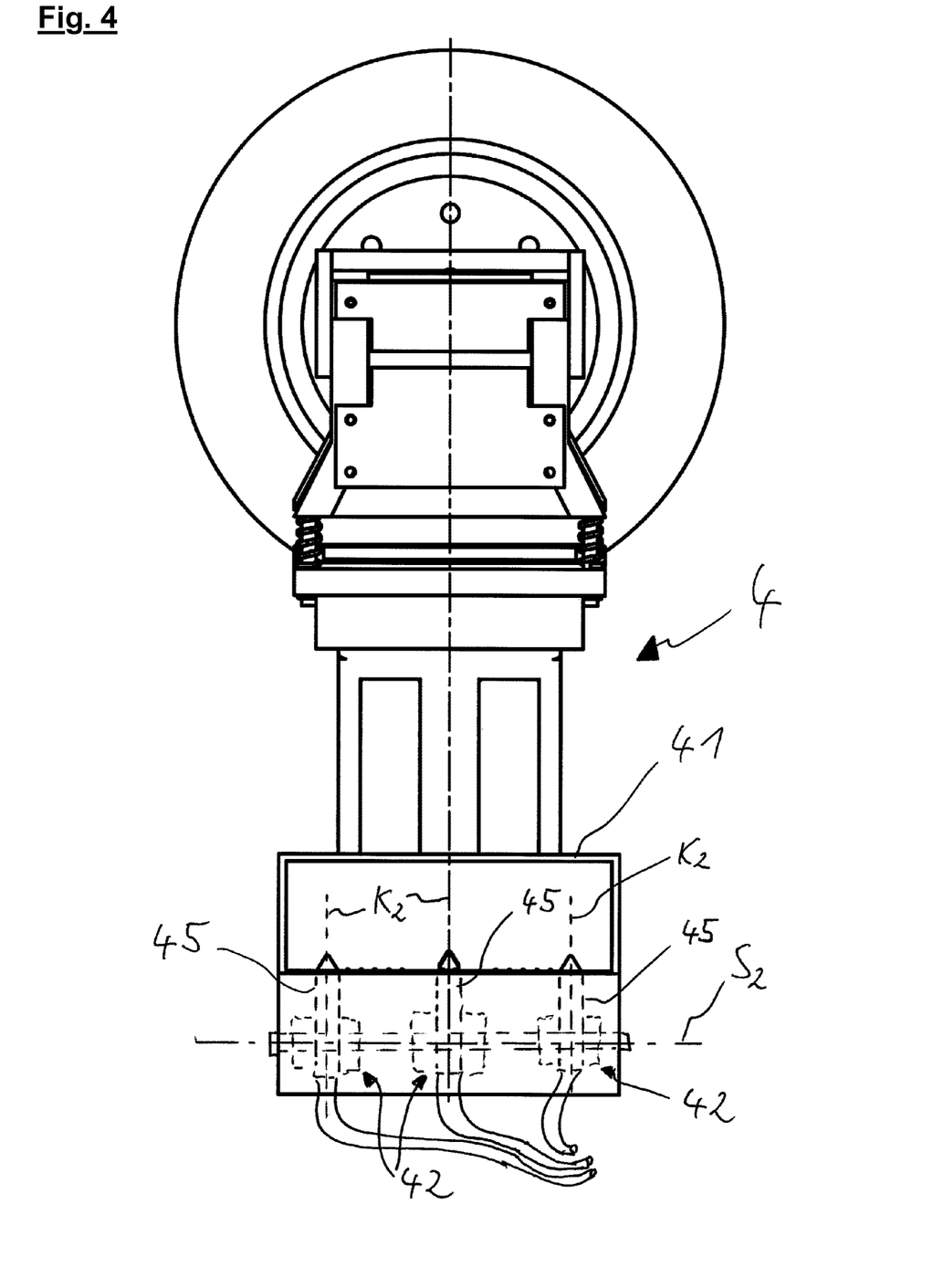
FIG. 4 is a plan view of a preferred embodiment of a second connection unit.

FIG. 4 illustrates a plan view of a preferred embodiment of the second connection unit 4, wherein it is apparent that the second connection unit 4 advantageously comprises three second plug-in units 42 that are each equipped with accordingly one coupling region 45. The second plug-in units 42 can in this case pivot preferably cohesively about the second pivot axis $S_2$ and render it possible to produce multiple connections to the first connection unit 2 (not illustrated here) and to connect a multiplicity of individual line elements. It goes without saying that in addition to the embodiment illustrated in FIG. 4, further embodiments can be preferred in which at least two, advantageously up to six, plug-in units can be provided both on the first connection unit and also on the second connection unit in order to be able to transmit a multiplicity of electrical signals, electrical signals and power, and also fluid pressure.

Figure 5:
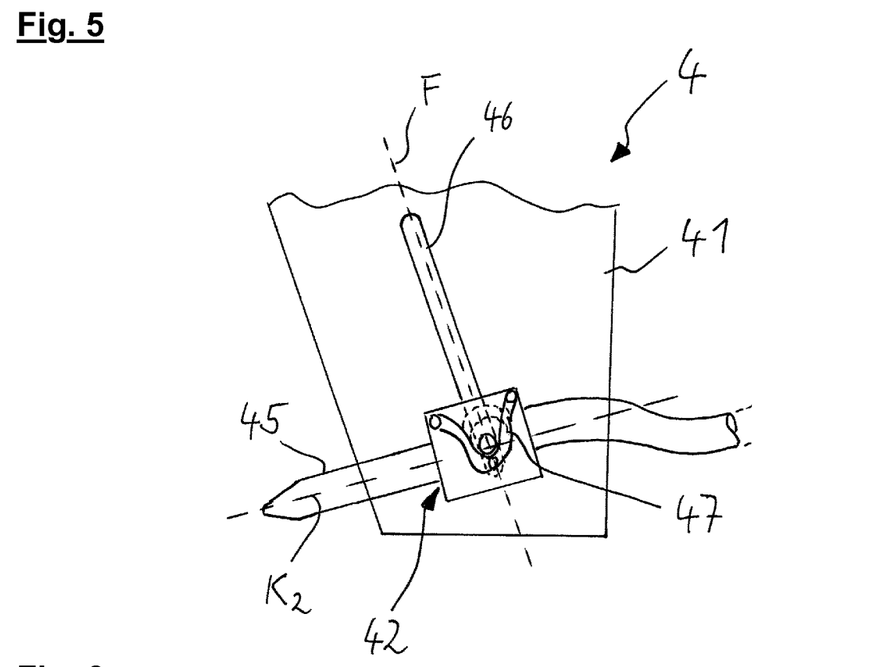
FIG. 5 is a detailed view of a preferred embodiment of the second connection unit.

FIG. 5 illustrates a detailed view of a preferred embodiment of the second connection unit 4 in which the second plug-in unit 42 is pre-stressed and held in its idle position that is illustrated in FIG. 5 by way of a second restoring means 47, wherein a pivot movement of the second plug-in unit 42 is possible both upwards and also downwards and in this case the second restoring means 47 generates a corresponding restoring force. The second restoring means 47 supports itself advantageously in this case on the inner face of the guiding geometric shape 46 and transmits via two corresponding resilient sections in each case a restoring force to the schematically illustrated rectangular geometric shape of the second plug-in unit 42. In an alternative embodiment that is not illustrated here, the second restoring means 47 can also be embodied as a rubber element that comprises an elongated section that in turn engages with the guiding geometric shape 46 and accordingly generates a corresponding restoring force by way of an elastic deformation of the rubber element as the second plug-in unit 42 pivots relative to the guiding geometric shape 46 and thus relative to the carrier unit 41. A rubber element has the advantage that this can in addition still have a damping effect on a pivot movement of the second plug-in unit.

Figure 6:
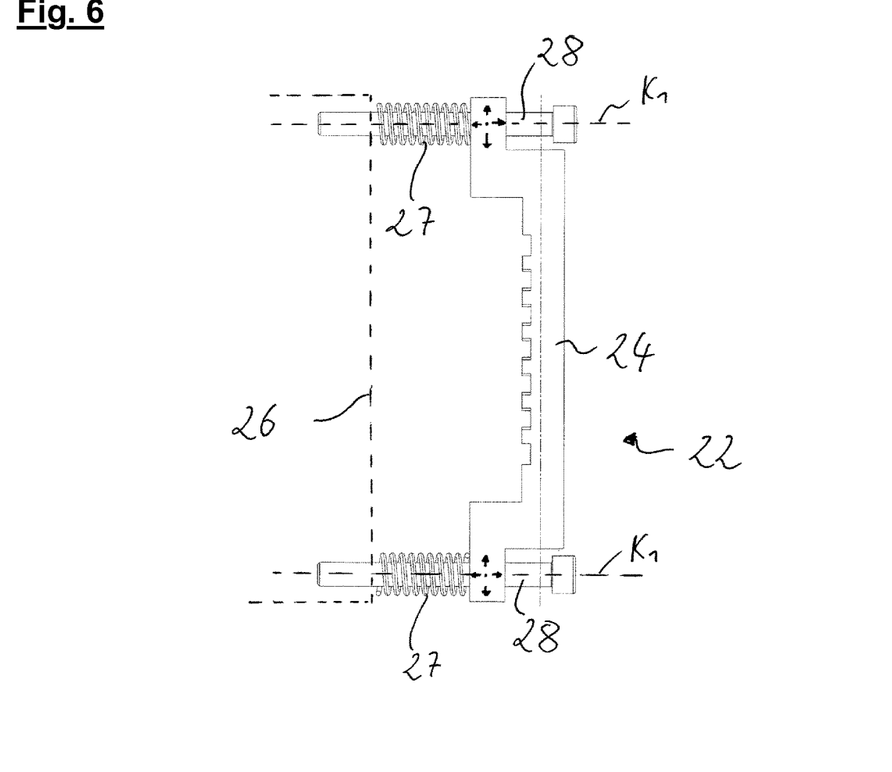
FIG. 6 is a top plan view of a preferred embodiment of a plug-in unit.

FIG. 6 illustrates a detailed view of the floating mounting arrangement on one of the plug-in units 22, 42. By way of example, this figure illustrates the first plug-in unit 22 that is arranged and fixed below the fifth-wheel coupling plate on the towing vehicle A. In this case, the connector head 24 illustrated in FIG. 1 that is mounted on the base part 26 (indicated by the broken line) by way of guide pins 28 is illustrated in this view as seen from above. In this case, a clearance of 1 mm to 5 mm is provided between the receiving bore holes on the connector head 24 and the guide pins 28, which renders it possible to offset the connector head 24 in a transverse manner with respect to the first coupling axis $K_1$ and thus facilitates a coupling with the opposite-lying plug-in unit 42 if this is slightly oblique and/or offset. In this case, a slight rotation about the longitudinal axis of the towing vehicle can occur in the millimeter range, for example up to 2° deflection. Advantageously, the previously described delimited floating mounting arrangement on the plug-in unit, in the present example on the first plug-in unit 22, is realized by means of the connector head 24 being mounted in a floating manner.

Reference Numerals

2 - First connection unit
21 - First carrier unit
22 - First plug-in unit
24 - First connector head
25 - First coupling region
26 - First base part
27 - First restoring means
28 - Guide pins
4 - Second connection unit
41 - Second carrier unit
42 - Second plug-in unit
45 - Second coupling region
46 - Guiding geometric shape
47 - Second restoring means
5 - Insertion aid
6 - Stop
A - Towing vehicle
B - Semi-trailer
F - Guide path
$K_1$ - First coupling axis
$K_2$ - Second coupling axis
$P_1$ - First center of gravity
$S_1$ - First pivot axis

| Reference Numerals |
| --- |
| S₂ - Second pivot axis |
| S₃ - Third pivot axis |

The invention claimed is:

1. A connection system for use on a fifth-wheel coupling, comprising:
    a first connection unit configured to be fixed to a towing vehicle; and
    a second connection unit configured to be fixed to a semi-trailer;
    wherein the first connection unit comprises a first carrier unit and a first plug-in unit having a first coupling axis;
    wherein the first plug-in unit is mounted on the first carrier unit so as to be able to pivot about a first pivot axis;
    wherein the second connection unit comprises a second carrier unit and a second plug-in unit having a second coupling axis;
    wherein the second plug-in unit is mounted on the second carrier unit so as to be able to pivot about a second pivot axis;
    wherein the first plug-in unit and the second plug-in unit respectively comprise at least one coupling region of an electrical line element and/or at least one fluid-conveying line;
    wherein the second connection unit is mounted on the semi-trailer so to be able to pivot about a third pivot axis in such a manner that the second connection unit can be moved into a coupling position, wherein when the second connection unit is in the coupling position the second pivot axis extends parallel to the first pivot axis;
    wherein the first coupling axis is oriented essentially in a collinear manner with respect to the second coupling axis if the first plug-in unit and the second plug-in unit are located in the coupling position; and
    wherein the second carrier unit comprises a guiding region that allows the second plug-in unit to be displaced in a transverse manner with respect to the second pivot axis along a guide path and secures the second plug-in unit against being displaced in a transverse manner with respect to the guide path.

2. The connection system as claimed in claim 1,
    wherein the first plug-in unit may be moved to an idle position, wherein a restoring member engages with the first plug-in unit and/or the center of gravity of the first plug-in unit is spaced apart from the first pivot axis such that a restoring force that leads to the idle position is prevailing at the first plug-in unit; and
    wherein the center of gravity of the first plug-in unit is spaced apart from the first pivot axis with a 0.1 to 0.3 times the maximal length of the first plug-in unit measured along the first coupling axis.

3. The connection system as claimed in claim 1, wherein the first plug-in unit and/or the second plug-in unit may be moved to an idle position, wherein the first plug-in unit and/or the second plug-in unit are able to pivot with a maximal pivot angle of between 7° to 40° out of the idle position in at least one direction.

4. The connection system of claim 3, wherein the maximal pivot angle is 10° to 30°.

5. The connection system of claim 4, wherein the maximal pivot angle is 10° to 20°.

6. The connection system as claimed in one claim 1, wherein at least one of the plug-in units further comprises a delimited floating mounting arrangement.

7. The connection system as claimed in claim 1, wherein when the first plug-in unit is in an idle position the first coupling axis is oriented parallel to a surface on which the towing vehicle is standing.

8. The connection system as claimed in claim 1, wherein the first plug-in unit further comprises at least one connector head that comprises an engagement member for engaging with the second plug-in unit, wherein the first connector head is pre-stressed by she a restoring member with respect to a first base part of the first plug-in unit, and wherein the restoring member is configured to allow the first connector head to be displaced in a resilient manner along the first coupling axis relative to the first base part.

9. The connection system as claimed in claim 1, wherein the second plug-in unit is influenced by a restoring member with a restoring force which guides the second plug-in unit into an idle position relative to the second carrier unit, and wherein the second plug-in unit can be pivoted in both pivot directions about the second pivot axis against the respective restoring force of the restoring member.

10. The connection system as claimed in claim 1, wherein the first connection unit is fixed below a coupling plate of a fifth-wheel coupling, and wherein the second connection unit is fixed directly or adjacent to a kingpin of the semi-trailer.

11. The connection system as claimed in claim 1, wherein the guiding region is embodied as an elongated hole and the guide path is a straight line.

12. The connection system as claimed in claim 1, wherein an insertion aid is fixed indirectly or directly to the first carrier unit and/or to the second carrier unit and the insertion aid pivots the respectively opposite-lying plug-in unit during the coupling procedure such that the coupling axes move into collinearity with one another.

* * * * *